(12) United States Patent
Putnam et al.

(10) Patent No.: US 6,594,288 B1
(45) Date of Patent: Jul. 15, 2003

(54) TUNABLE RAMAN LASER AND AMPLIFIER

(75) Inventors: Martin A. Putnam, Cheshire, CT (US); Alan D. Kersey, South Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 13 days.

(21) Appl. No.: 09/707,083

(22) Filed: Nov. 6, 2000

(51) Int. Cl.$^7$ ................................................. H01S 3/30
(52) U.S. Cl. ................................ 372/3; 372/20; 372/22
(58) Field of Search ........................... 372/3, 20, 22; 359/345, 341; 358/12

(56) References Cited

U.S. PATENT DOCUMENTS

| | | | |
|---|---|---|---|
| 4,725,110 A | 2/1988 | Glenn et al. ............... 350/3.61 |
| 4,807,950 A | 2/1989 | Glenn et al. ............... 350/3.61 |
| 4,915,467 A | 4/1990 | Berkey ..................... 350/96.15 |
| 5,007,705 A | 4/1991 | Morey et al. ............. 350/96.29 |
| 5,042,898 A | 8/1991 | Morey et al. ................. 385/37 |
| 5,235,659 A | 8/1993 | Atkins et al. ............... 385/124 |
| 5,258,988 A | 11/1993 | Whittley ........................ 372/3 |
| 5,265,106 A | 11/1993 | Garcia et al. ................... 372/3 |
| 5,293,394 A | 3/1994 | Whittley ........................ 372/3 |
| 5,323,404 A | 6/1994 | Grubb |
| 5,388,173 A | 2/1995 | Glenn ......................... 385/37 |
| 5,469,520 A | 11/1995 | Morey et al. |
| 5,691,999 A | 11/1997 | Ball et al. |
| 5,745,626 A | 4/1998 | Duck et al. ................... 385/96 |
| 5,815,518 A | 9/1998 | Reed et al. ..................... 372/6 |
| 5,838,700 A | 11/1998 | Dianov et al. .................. 372/6 |
| 5,912,910 A | * 6/1999 | Sanders et al. ................ 372/22 |
| 5,966,480 A | 10/1999 | LeGrange et al. ............. 385/27 |
| 6,122,096 A | * 9/2000 | Fatchi ......................... 359/341 |
| 6,229,827 B1 | * 5/2001 | Fernald et al. ................ 372/20 |
| 6,229,828 B1 | * 5/2001 | Sanders ...................... 372/22 |
| 6,310,990 B1 | * 10/2001 | Putnam et al. ................ 385/12 |
| 6,344,925 B1 | * 2/2002 | Grubb et al. ................ 359/345 |
| 6,363,089 B1 | * 3/2002 | Fernald et al. ................ 372/20 |

FOREIGN PATENT DOCUMENTS

| | | |
|---|---|---|
| EP | 0954072 | 11/1999 |
| EP | 0984532 | 3/2000 |
| WO | WO 8204328 | 12/1982 |
| WO | WO 9530926 | 11/1995 |
| WO | WO 0037969 | 6/2000 |
| WO | WO 0039617 | 7/2000 |
| WO | WO 0049721 | 8/2000 |

* cited by examiner

*Primary Examiner*—Paul Ip
*Assistant Examiner*—Tuan Nguyen

(57) ABSTRACT

A tunable Raman laser and amplifier include a pair of tunable optical units optically connected by a length of optical fiber having an associated Raman gain. The tunable optical units tune respective optical waveguides, each of which includes an inner core disposed within an outer cladding. A plurality of Bragg gratings is written in each core of the waveguides. The reflection wavelengths of each Bragg grating of the input waveguide is the same as the reflection wavelength of a matched grating of the output waveguide, to thereby form a plurality of cascaded resonance cavities. Each resonance cavity has a reflecting wavelength equal to the center wavelength of successive Stokes orders associated with optical fiber. The Bragg gratings of each waveguide are written into a corresponding stepped region ground into the outer cladding of the waveguides. The tuning (e.g., compression) of the waveguides proportionally changes the reflection wavelengths of the gratings, and thereby proportionally changes the center wavelength of each resonance cavity. This method of proportionally tuning each matched pair of Bragg gratings enables the Raman laser to be tunable over an extended wavelength range.

32 Claims, 4 Drawing Sheets

TUNABLE RAMAN LASER AND AMPLIFIER

CROSS REFERENCE TO RELATED APPLICATIONS

Co-pending U.S. Patent Applications, Ser. No. 09/705, 326, entitled "Tunable External Cavity Semiconductor Laser Incorporating a Tunable Bragg Grating" filed Nov. 3, 2000; and U.S. patent application Ser. No. 09/707,084, entitled "Compression-Tuned Bragg Grating-Based Laser", filed contemporaneously herewith, contains subject matter related to that disclosed herein, and which is incorporated by reference in its entirety.

TECHNICAL FIELD

The present invention relates to Raman lasers and amplifiers, and more particularly to a tunable Raman laser and amplifier using a plurality of Bragg gratings to define a cascaded resonator configuration.

BACKGROUND ART

Fiber Bragg gratings and other grating elements are finding widespread use in both telecommunications and sensing applications. Gratings have also enabled new configurations of fiber lasers and optical signal amplifiers.

Cascaded cavity Raman lasers and optical signal amplifiers, which utilize the stimulated Raman scattering (SRS) in an optical fiber, are known. Raman scattering, a non-linear optical process, is a process in which a small fraction of incident light is scattered by vibrational modes within a non-linear medium (e.g. a silica-based fiber) and is shifted by a known Stokes shift to a typically longer wavelength.

An exemplary cascaded Raman laser 10, as shown in FIG. 1, has an input section 12 including four fiber Bragg gratings 14–17, and an output section 18 also including four fiber Bragg gratings 20–23 that match the gratings in the input section, similar to that described in U.S. Pat. No. 5,323,404. Each pair of matched fiber Bragg gratings (14 and 20, 15 and 21, 16 and 22, 17 and 23) forms an optical cavity, with the gratings having high reflectivity. Pump radiation, having a pump wavelength $\lambda_p$, propagates essentially unimpeded through the input section 12 into the optical fiber 24, where most of the radiation will be converted by Raman scattering to radiation at a higher wavelength corresponding to a first order Stokes shift, which is then reflected within the first cavity defined by the first pair of matched fiber Bragg gratings (14 and 20). The reflected radiation of the first resonance cavity is then substantially converted by Raman scattering to a higher wavelength corresponding to the second order Stokes shift, which is reflected within the second cavity defined by the second pair of matched fiber Bragg gratings (15 and 21). The reflected radiation of the second resonance cavity is then substantially converted by Raman scattering to a higher wavelength corresponding to the third order Stokes shift, which is reflected within the third cavity defined by the third pair of matched fiber Bragg gratings (16 and 22). The reflected radiation of the third resonance cavity is then substantially converted by Raman scattering to a higher wavelength corresponding to the fourth order Stokes shift, which is reflected with the fourth cavity defined by the fourth pair of matched fiber Bragg gratings (17 and 23). This radiation at the fourth order Stokes shift is then available for utilization.

The use of fiber Bragg gratings to create a resonant cavity increases the optical power in the fiber and has allowed Raman amplification in shorter lengths of fiber. However, as a result of the relatively narrow bandwidth of the Stokes order, Raman lasers and amplifiers are not tunable over an extended wavelength range.

SUMMARY OF THE INVENTION

An object of the present invention is to provide a tunable Raman laser and tunable Raman optical amplifier by which the lasing wavelength of the Raman laser and amplification wavelength of the Raman amplifier can be tuned to allow a more extended adjustment of the output wavelength.

In accordance with an embodiment of the present invention, a tunable Raman laser comprises a pump source that provides pump radiation having a predetermined wavelength. A first optical waveguide includes at least a pair of first reflective elements. Each of the first reflective elements has a respective reflection wavelength. A second optical waveguide includes at least a pair of second reflective elements. Each of the second reflective elements has a respective reflection wavelength, wherein each of the first reflective elements has a respective reflection wavelength substantially the same as a reflection wavelength of a corresponding one of the second reflective elements to form at least a pair of resonant cavities. An optical waveguide, which is optically coupled between the first optical waveguide and the second optical waveguide, provides Raman gain. A tuning device, responsive to a signal representative of a desired output wavelength, stresses the first and second optical waveguides to change the reflective wavelengths of the first and second reflective elements. Portions of each of the first and second optical waveguides have different cross-sectional areas such that when the first and second optical waveguides are stressed, the reflection wavelengths of the first reflective elements change proportionally and the reflection wavelengths of the second reflective elements change proportionally.

In accordance with an embodiment of the present invention, a tunable Raman optical amplifier for amplifying an input light signal having a wavelength is provided. The amplifier comprises a pump source that provides pump radiation having a predetermined wavelength. An optical coupler couples the pump radiation into the input light signal. A first optical waveguide includes at least a pair of first reflective elements. Each of the first reflective elements has a respective reflection wavelength. A second optical waveguide includes at least a pair of second reflective elements. Each of the second reflective elements has a respective reflection wavelength, wherein each of the first reflective elements has a respective reflection wavelength substantially the same as a reflection wavelength of a corresponding one of the second reflective elements to form at least a pair of resonant cavities. An optical waveguide, which is optically coupled between the first optical waveguide and the second optical waveguide, provides Raman gain. A tuning device, responsive to a signal representative of a desired output wavelength, stresses the first and second optical waveguides to change the reflective wavelengths of the first and second reflective elements. Portions of each of the first and second optical waveguides have different cross-sectional areas such that when the first and second optical waveguides are stressed, the reflection wavelengths of the first reflective elements change proportionally and the reflection wavelengths of the second reflective elements change proportionally.

BEST MODE FOR CARRYING OUT THE INVENTION

Figure 2:
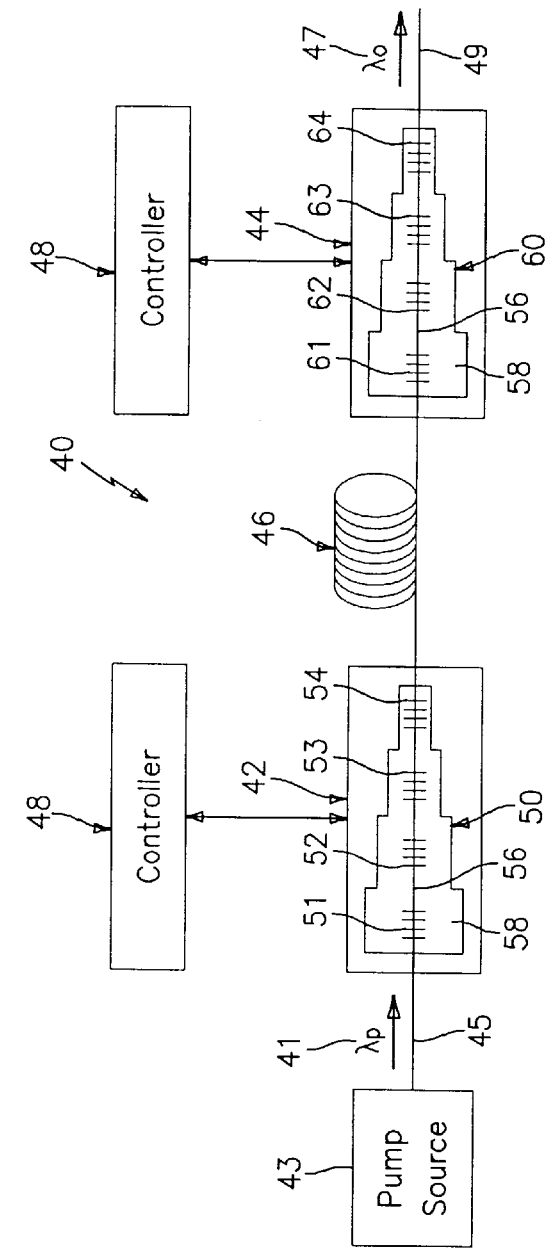
FIG. 2 is a block diagram of a tunable Raman laser, in accordance with the present invention.

Referring to FIG. 2, a tunable Raman laser, generally shown as 40, includes a tunable input optical unit 42 coupled to a tunable output optical unit 44 by a predetermined length of silica-based optical fiber 46 having a Raman gain (or spectrum) associated therewith (hereinafter referred as "Raman gain fiber"). The input and output optical units 42, 44 are similar to that disclosed in co-pending U.S. patent application Ser. No. 09/456,112, entitled "Compression-Tuned Bragg Grating and Laser", which is incorporated by reference in its entirety. A pump source 43 provides pump radiation 41, having a wavelength $\lambda_p$, into a single mode optical fiber 45, which is coupled optically to the input optical unit. Output radiation 47, having a wavelength $\lambda_p$, is emitted from a single mode optical fiber 49, which is coupled optically to the output optical unit 44.

Each tunable optical unit 42,44 includes a respective bulk or large diameter optical waveguide 50,60, each of which has an inner core 56 disposed axially within an outer cladding 58, as will be described in greater detail hereinafter. A plurality of reflective elements 51–54,61–64, such as Bragg gratings, is written within the cores of each respective optical waveguide 50,60, whereby each grating has a predetermined Bragg reflection (or center) wavelength $\lambda_1$–$\lambda_4$. The Bragg gratings reflect a portion of the light, and pass the remaining wavelengths of the incident light (within a predetermined wavelength range). The gratings are a periodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

In an exemplary embodiment shown in FIG. 2, each waveguide 50,60 has four gratings, however, one will recognize that any number of gratings greater than two may be used. Each Bragg grating 51–54 written in waveguide 50 of the input optical unit 42 has the same reflection wavelength as a matched Bragg grating 61–64 written in waveguide 60 of the output optical unit 44. Each pair of matched gratings (i.e., 51 and 61, 52 and 62, 53 and 63, 54 and 64), therefore, forms a resonance cavity that, when combined, provides an overall cascaded grating resonator configuration.

In accordance with a control algorithm, at least one controller 48, such as a microcontroller or microprocessor, generates a control signal for tuning one or both of the optical units 42,44, in response to a desired Raman laser output wavelength, and compression feedback of the waveguides 50,60.

Figure 1:
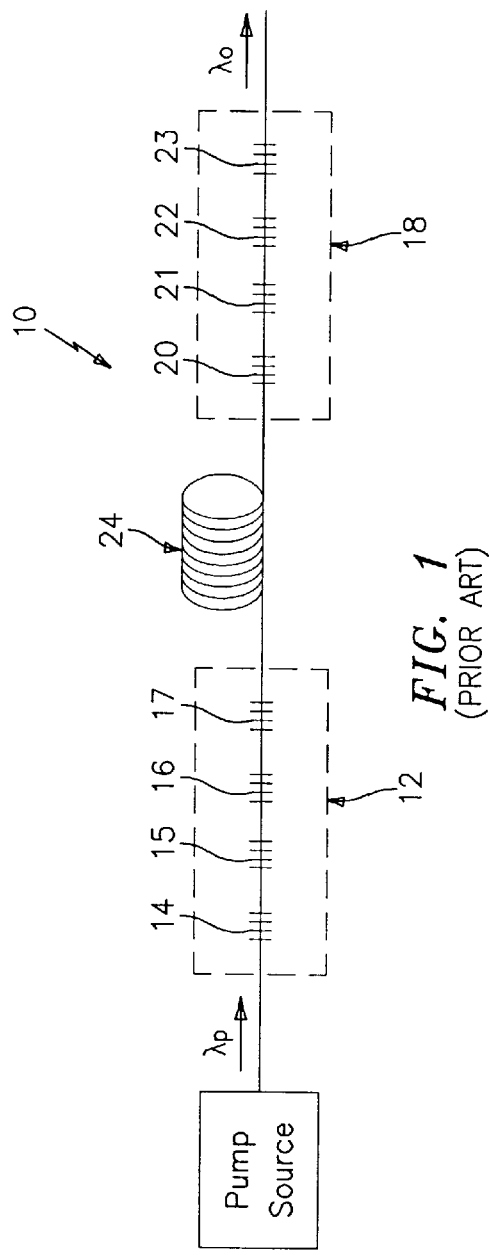
FIG. 1 is a block diagram of a Raman laser, in accordance with the prior art.
Figure 3:
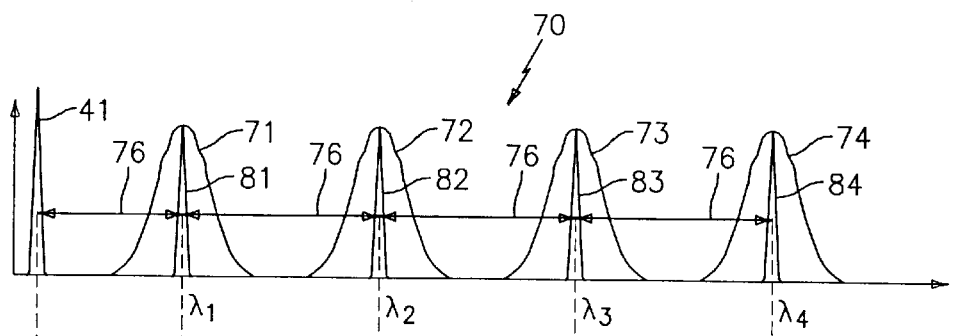
FIG. 3 is a graphical representation of an initial state of the Raman orders of the resulting lased light generated by the Raman laser, in accordance with the present invention.

FIG. 3 illustrates the Raman gain profile 70 having successive Stokes orders 71–74 resulting from the fourth order cascaded resonator configuration, similar to that described hereinbefore, while the tunable laser 40 of FIG. 1 is in an initial preload condition. The reflection wavelengths $\lambda_1$–$\lambda_4$ of each pair of matched gratings (51 and 61, 52 and 62, 53 and 63, 54 and 64) are set to align with the known offset wavelength equal to the Stokes shift (i.e., 76) between each of the Stokes orders 71–74. Specifically, the first pair of matched gratings 51,61 is written to have a reflection wavelength $\lambda_1$ centered at the first Stokes order 71 of the pump radiation 41 generated by the Raman gain fiber 46. The second pair of matched gratings 52,62 is written to a reflection wavelength $\lambda_2$ centered at the second Stokes order 72 generated by the first resonance cavity provided by the first pair of match gratings 51,61. The third pair of matched gratings 53,63 is written to a reflection wavelength $\lambda_3$ centered at the third Stokes order 73 generated by the second resonance cavity provided by the second pair of matched gratings 52,62. The fourth pair of matched gratings 54,64 is written to a reflection wavelength $\lambda_4$ centered at the fourth Stokes order 74 generated by the third resonance cavity provided by the third pair of gratings 53,63.

In an exemplary embodiment, the pump source 43 may include a diode pumped $Yb^{+3}$ laser, pumped at 1117 nm, to produce a laser output $\lambda_o$ 47 at 1395 nm. The first pair of gratings 51,61 may have a reflection wavelength at 1175 nm, corresponding to the peak of the first Stokes order 71. The second pair of gratings 52,62 may have a reflection wavelength $\lambda_2$ at 1240 nm, corresponding to the peak of the second Stokes order 72. The third pair of gratings 53,63 may have a reflection wavelength $\lambda_3$ at 1315 nm, corresponding to the peak of the third Stokes order 73. The fourth pair of gratings 54,64 may have a reflection wavelength $\lambda_4$ at 1395 nm, corresponding to the peak of the fourth Stokes order 74.

Figure 4:
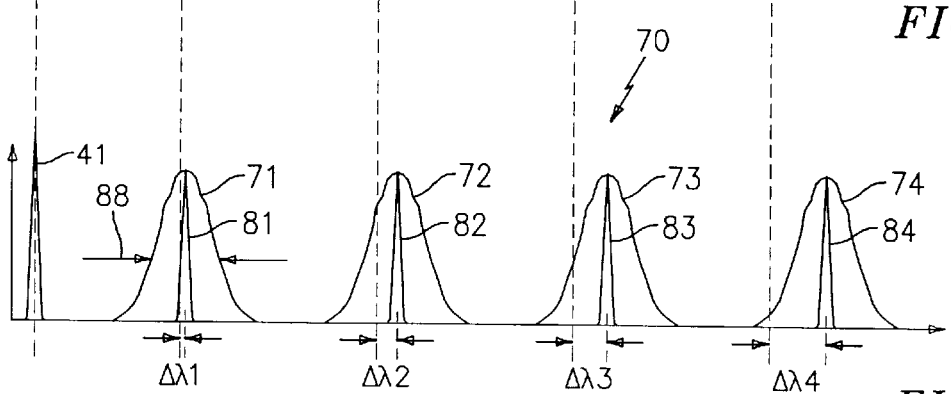
FIG. 4 is a graphical representation of the Raman orders of the resulting lased light generated by the Raman laser tuned to a selected output wavelength, in accordance with the present invention.

As shown in FIGS. 3 and 4, the successive Stokes orders 71–74 of the pump radiation 41 are superimposed over the laser gain profile 81–84 of the pump radiation to illustrate how each successive Raman Stokes order is used to allow the translation of the lasing wavelength from a starting first Stokes order 71 to a final Stokes order 74, as described hereinbefore. The tunability of such a cascaded Raman laser 40 is limited due to the relatively narrow bandwidth 88 of the Stokes orders 71–74 of the Stokes gain profile 70. For instance, if the output set of gratings 61–64 were tunable, the range of tunability would be limited by the Raman gain bandwidth 88. However, if all the gratings in the cavities are tunable in a proportional manner, the lasing output 47 can be tuned over a greater range. For instance, to achieve the desired result, the first pair of matched gratings may need to shift by 1 nm, the second pair of matched gratings by 2 nm, the third pair of matched gratings by 3 nm and so on, up to the $n^{th}$ pair of matched gratings. This proportional tuning optimizes the gain of the cascaded systems to extend the tunable range of the Raman laser by shifting the successive gain peaks of each of the Stokes orders used in the cascaded system by a predetermined wavelength shift, which is greater than the wavelength of the previous Stokes order.

Specifically, as best shown in FIG. 4, the peak of the second Stokes order 72 can be shifted to a greater center wavelength by increasing the reflection wavelength $\lambda_1$ of the first pair of gratings 51,61 by a predetermined wavelength shift (e.g., $\Delta\lambda_1$), provided the reflection wavelength is within the bandwidth 88 of the first Stokes order 71. The peak of the third Stokes order 73 is then shifted to a greater center wavelength by increasing the reflection wavelength $\lambda_2$ of the second pair of gratings 52,62 by a predetermined wavelength shift (e.g., $\Delta\lambda_2$), which is greater than the predetermined shifted wavelength ($\Delta\lambda_1$) of the first pair of gratings 51,61, again, provided the reflection wavelength $\lambda_2$ is within the bandwidth 88 of the second Stokes order 72. The delta of each subsequent pair of gratings ($\Delta\lambda_1$–$\Delta\lambda_4$), therefore, increases proportionally, to shift the successive Stokes order to a greater wavelength for allowing the reflection wavelengths of the subsequent pair of gratings to expand greater than the expansions of the wavelengths of the previous pair of gratings. This method of proportionally tuning each matched pair of gratings has the advantage of allowing nearly any telecommunications wavelength to be accessed using pump wavelengths where high power pump devices currently exist.

While it may be possible to independently tune the gratings in a precisely proportional manner, this method of tuning is difficult. To simplify the tuning of the Bragg gratings 51–54,61–64, the Bragg gratings 51–54 of the input optical unit 42 are written into a single bulk waveguide 50, and the Bragg gratings 61–64 of the output optical unit 44 are written into a single bulk waveguide 60. The input optical unit 42 is substantially the same as the output optical unit 44, and therefore, only the input optical unit will be described.

Figure 6:
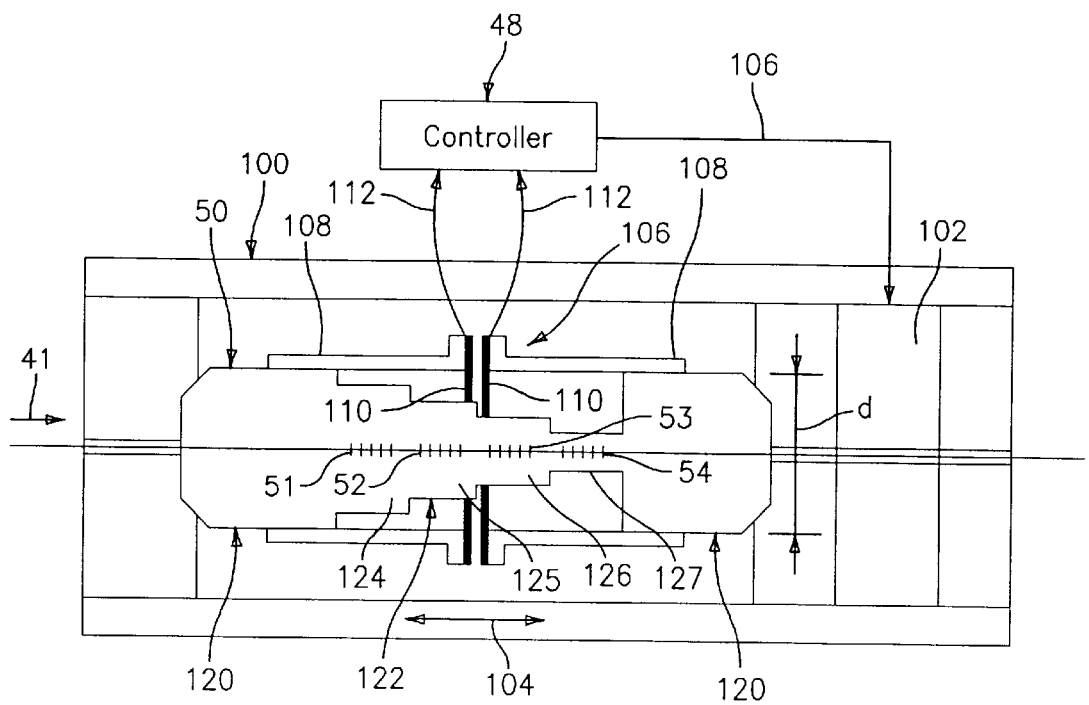
FIG. 6 is a side view of a tunable grating device of a tunable Raman laser and block diagram of a positional/force feedback control circuit, in accordance with the present invention.

As best shown in FIG. 6, the optical waveguide 50 may be etched, grounded or machined to form a generally "dog-bone" shape 120, having axial end portions 122 and an intermediate portion 122 disposed therebetween. The intermediate portion 122 of the waveguide 50 is formed to have a plurality of axially stepped regions 124–127 corresponding to the number of gratings, wherein the outer diameter of each stepped region incrementally increases or decreases in the axial direction. Each grating 51–54 of the waveguide 50 is written into one stepped region 124 of the intermediate portion 122. Specifically, the grating 51 having the lowest reflection wavelength $\lambda_1$, is disposed in the stepped region 124 having the greatest cross-sectional area (e.g., outer diameter). The grating 52 having the next highest reflection wavelength $\lambda_2$ is disposed in the stepped region 125 having the next smaller cross-sectional area, and so. The grating 54 having the highest reflection wavelength $\lambda_4$, therefore, is disposed in the stepped region 127 having the smallest cross-sectional area.

Figure 5:
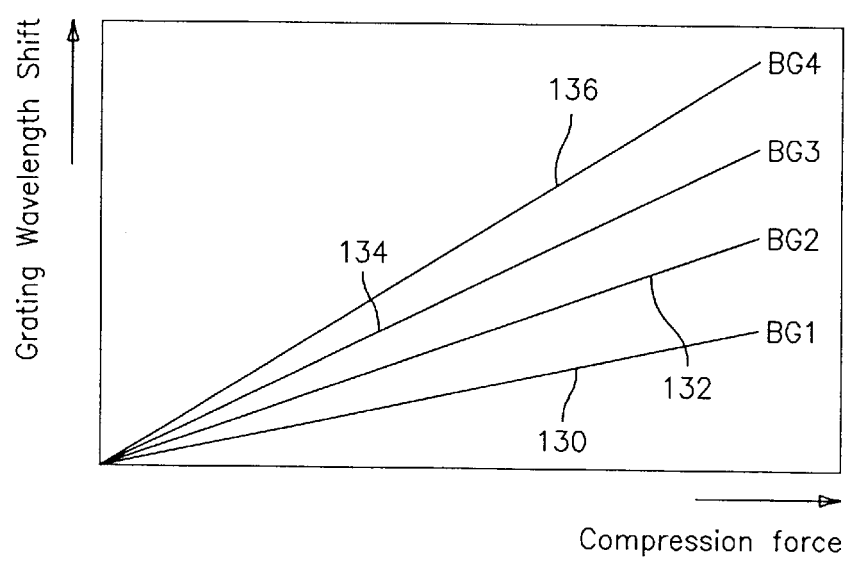
FIG. 5 is a graph illustrating the wavelength shift of each grating disposed in an optical waveguide over a range of compressive forces, in accordance with the present invention.

As is known, when the stepped waveguide 50 is compressed, the spacings between the grating elements of each grating 51–54 are reduced, thus increasing the reflection wavelength of the gratings. The rate of wavelength change, therefore, is directly proportional to the cross-sectional area of the stepped region that the grating is written. Consequently, as shown in FIG. 5, as the waveguide is compressed, the rate of shift the reflection wavelengths $\lambda_1$–$\lambda_4$ of each grating 51–54 changes proportionally as defined by the dimensions of the steppe regions of the waveguide. For example, curve 130 represents the first grating 51 disposed in the stepped region 124 of the waveguide 50 having the largest cross-sectional area. Curve 132 represents the second grating 52 disposed in the stepped region 125 of the waveguide having the next smallest cross-sectional area. Curve 134 represents the third grating 53 disposed in the stepped region 126 of the waveguide having the next smallest cross-sectional area. Curve 136 represents the fourth grating 54 disposed in the stepped region 127 of the waveguide 50 having the smallest cross-sectional area.

Therefore, as the stepped waveguide 50 is compressed, the change of the reflection wavelengths $\lambda_1$–$\lambda_4$ of each grating 51–54 will be different. For instance, as shown in FIGS. 3 and 4, under a predetermined range of compressive force, the grating 51 disposed in the stepped region 124 will change by $\Delta\lambda_1$, the gratings 52–54 in regions 125–127 will change by $\Delta\lambda_2$, $\Delta\lambda_3$, $\Delta\lambda_4$, respectively, with each successive grating having a proportionally greater change in reflection wavelength in relations to the comparative proportions of the cross-sectional area of the regions of the intermediate portion 122 of the waveguide 50.

In an exemplary embodiment of the tunable Raman laser 40 of FIG. 2, the Raman gain fiber 46 may be Germanium-doped for generating a laser output 47 centered at a wavelength of 1480 nm. The radiation 41 of the pump source 43 has a center wavelength of 1175 nm. The matched pair of gratings 51,61 of the first resonant cavity is centered at 1240 nm, the second matched pair of gratings 52,62 at 1315 nm, the third matched pair of gratings 53,63 at 1395 nm and the fourth matched pair of gratings 54,64 at 1480 nm.

The optical waveguides 50,60 comprise silica glass ($SiO_2$) having the appropriate dopants, as is known, to allow light to propagate along the inner cores 56, and have an outer diameter (d) of at least 0.3 mm. The waveguides may be formed by using fiber drawing techniques now know or later developed that provide the resultant desired dimensions for the core 56 and the outer dimensions of the cladding 58, similar to that disclosed in co-pending U.S. patent application, Ser. No. 09/455,868 entitled "Large Diameter Optical Waveguide, Grating, and Laser". A pair of fibers or "pigtails" may be attached to the ends of the waveguides by known techniques, such as epoxy or glass fusion.

Alternatively, the waveguides 50,60 may be formed by heating, collapsing and fusing a glass capillary tube to a fiber by a laser, filament, flame, etc., as is described in copending U.S. patent application, Ser. No. 9/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

While the reflective elements have been described as Bragg gratings, one will recognize that any wavelength-tunable grating or reflective element embedded, written, etched, imprinted, or otherwise formed in the inner core 56 may be used if desired. As used herein, the term "grating" means any of such reflective elements.

Other materials and dimensions for the optical waveguides 50,60 may be used if desired. For example, the waveguides may be made of any glass, e.g., silica, phosphate glass, or other glasses, or made of glass and plastic, or solely plastic.

To accomplish the proportional tuning of each of the gratings 51–54 of the optical waveguides 50, the tunable optical units 42 may be a compression-tuned grating unit, which includes a compressing device or housing 100 for tuning each optical waveguide.

An actuator 102, such as a piezoelectric actuator, axially compresses a waveguide 50 within the compression device or housing 100, as indicated by arrows 104. Accordingly, the PZT actuator 102 provides a predetermined amount of force to compress the waveguide 50, and thereby tune the grating 51–54 to the desired reflection wavelengths. In response to a control signal generated by the controller 48 via conductor 106, the PZT actuator 102 is energized to provide the appropriate compression force necessary to tune the waveguide 50 to the desired Bragg reflection wavelengths $\lambda_1$–$\lambda_4$ of the gratings 51–54. The controller 48 adjusts the expansion and retraction of the actuator 102 in response to a displacement sensor 106 that provides feedback representative of the strain or compression of the waveguide 50 to form a non-optical closed-loop control configuration. In other words, light 42 propagating through the network or device is not used to provide feedback for the tuning of the waveguide 50.

In one embodiment, the displacement sensor 106 includes a pair of capacitive elements 108, similar to that disclosed in co-pending U.S. patent application, Ser. No. 09/519,802 entitled, "Tunable Optical Structure Featuring Feedback Control", filed Mar. 6, 2000, which is incorporated by reference in its entirety. The controller 48 measures the capacitance between the capacitive plates 110; and provides a sensed signal via conductors 112, indicative of the measured capacitance, to the controller 48. As the waveguide 50 is strained, the gap between the parallel capacitive plates 110 will vary, thereby causing the capacitance to change correspondingly. The change in capacitance is inversely proportional to the change in the reflection wavelength $\lambda_1$–$\lambda_4$ of the gratings 51–54.

Although the invention has been described with respect to using a capacitor to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of the waveguide 50, one should recognize that the grating units may be accurately and repeatably compressed/tuned to allow the grating unit to operate in an open loop mode.

Alternatively, the gratings 51–54 may be tuned by mechanically stressing (i.e. tension, bending) the waveguide 50, or varying the temperature of the gratings (i.e., using a heater), such as that described in U.S. Pat. No. 5,007,705, entitled "Variable Optical Fiber Bragg Filter Arrangement", to Morey et al., which is incorporated herein by reference.

Figure 7:
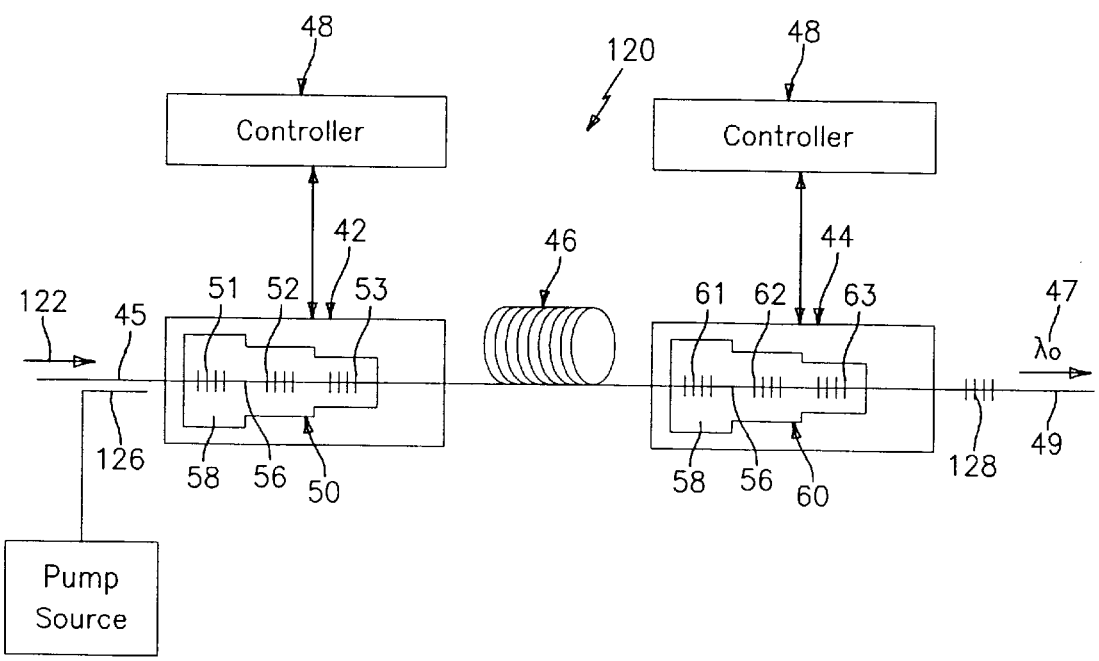
FIG. 7 is a block diagram of a tunable Raman amplifier, in accordance with the present invention.

In FIG. 7, a tunable Raman amplifier 120, which includes the cascaded grating configuration, as described hereinbefore, is illustrated. The components similar to previous embodiments will have the same reference numbers. The function of cascade grating configuration is substantially the same as that described in FIG. 2 and therefore, will not be described in detail.

The tunable Raman amplifier 120 receives an input optical signal 122 having a predetermined wavelength to be amplified. Radiation from a pump source 124 is coupled to the input fiber 45 of the amplifier through an optical coupler 126, such as a circulator or any other known optical couplers. The cascaded gratings 51–53,61–63 provide a plurality of resonance cavities to provide gain at the wavelength of the input optical signal 122, such as at the fourth Stokes order, centered at wavelength $\lambda_4$. The Raman amplifier 120 may also includes a blocking optical reflecting element 128, such as a fiber Bragg grating, at the output of the amplifier. The reflecting elements have a reflection wavelength substantially the same as the wavelength of the pump source 124 for blocking or reflecting back any pump radiation passing through the resonant cavities.

In an exemplary embodiment of the Raman amplifier 120 of FIG. 7, the Raman gain fiber 46 may be Germanium-doped for amplifying an optical input signal 122 centered at a wavelength of 1300 nm. The radiation of the pump source 124 has a center wavelength of 1064 nm. The matched pair of gratings 51,61 of the first resonant cavity is centered at 1117 nm, the second matched pair of gratings 52,62 at 1175 nm and the third matched pair of gratings 53,63 at 1240 nm. The blocking grating 128 has a center wavelength of 1064 nm.

Referring to FIGS. 2 and 7, one will recognize that while the location of the gratings 51–53,61–63 provides resonant cavities sequentially overlapping each other, the gratings may be arranged such that the resonant cavities are nested within one another. For example, the input waveguide 50 (or output waveguide 60) may be rotated 180 degrees to accomplish the nested resonant cavities.

Figure 8:
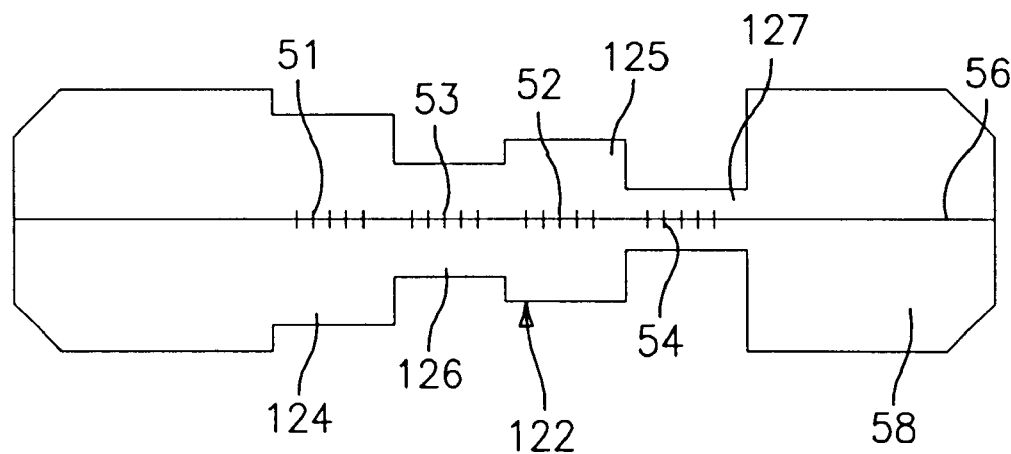
FIGS. 8 and 9 are side views of alternative embodiments of the waveguide, in accordance with the present invention.
Figure 9:
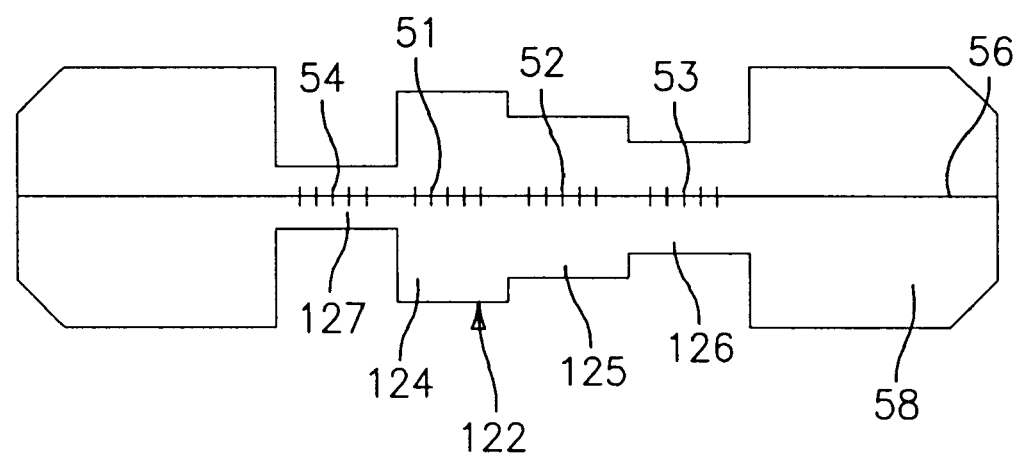

Further, one will also recognize that the resonant cavities may be overlapped or nested in any number of configurations by varying the stepped regions 124–127 of the intermediate portions 122 of the waveguides 50,60. For instance, FIGS. 8 and 9 illustrate two possible embodiments 140,142, respectively. Components similar to those of previous embodiments have similar reference numbers. It is important to note that each grating should be written in the stepped region of the waveguide having the substantially the same cross-sectional area.

One will also recognize that both optical waveguides 50,60 may be disposed with a single compressing device 100, similar to that described hereinabove, to enable the simultaneous tuning of the waveguides.

While the present invention has described tuning (or compressing) of the waveguides 50,60 to increase the wavelength of the output, one will recognize that the waveguides may be preloaded such that reduction of the compressive force to the waveguides will reduce the wavelength of the output.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. A tunable Raman laser comprising:

a pump source providing pump radiation having a predetermined wavelength;

a first optical waveguide including at least first and second reflective elements, the first and second reflective elements having respective first and second reflection wavelengths;

a second optical waveguide including at least third and fourth reflective elements, the third and fourth reflective elements having respective third and fourth reflection wavelengths, wherein the first and second reflection wavelengths of the respective first and second reflective elements are substantially the same as respective third and fourth reflection wavelengths of the third and fourth reflective elements to form at least a pair of resonant cavities;

an optical waveguide providing Raman gain optically coupled between the first optical waveguide and the second optical waveguide; and a tuning device, responsive to a signal representative of a desired output wavelength, that stresses the first and second optical waveguides to change the first, second, third and fourth reflective wavelengths of the respective first, second, third and fourth reflective elements;

whereby portions of each of the first and second optical waveguides have different cross-sectional areas such that when the first and second optical waveguides are stressed, the first and second reflection wavelengths of the first and second reflective elements change proportionally and the third and fourth reflection wavelengths of the third and fourth reflective elements change proportionally.

2. The tunable Raman laser of claim 1, wherein at least one of the first and second optical waveguides has an outer transverse dimension of at least 0.3 mm.

3. The tunable Raman laser of claim 1, wherein at least one of the first and second optical waveguides comprises a cane element.

4. The tunable Raman laser of claim 1, wherein at least one of the first and second optical waveguides comprises:

a tube, having an optical fiber and the reflective elements encased therein along a longitudinal axis of the tube, the tube being fused to at least a portion of the optical fiber.

5. The tunable Raman laser of claim 1, wherein each of the reflective elements comprises a Bragg grating written in the inner core of each of the respective first and second optical waveguides.

6. The tunable Raman laser of claim 1, wherein the tuning device comprises:

a first strain device that compresses axially the first optical waveguide to tune the first and second reflective elements to desired first and second reflection wavelengths; and a second strain device that compresses axially the second optical waveguide to time the third and fourth reflective elements to desired third and fourth reflection wavelengths.

7. The tunable Raman laser of claim 1, wherein the tuning device comprises:

a first strain device that tensions the first optical waveguide to tune the first and second reflective elements to desired first and second reflection wavelengths; and a second strain device that tensions the second optical waveguide to tune the third and fourth reflective elements to desired third and fourth reflection wavelengths.

8. The tunable Raman laser of claim 1, wherein the tuning device comprises:

a first thermal device that varies the temperature of at least the first optical waveguide to tune the first and second reflective elements.

9. The tunable Raman laser of claim 1, wherein the tuning device comprises:

a compression device that compresses axially at least the first optical waveguide to tune the first and second reflective elements to desired first and second reflection wavelengths, responsive to a displacement signal; and a displacement sensor, responsive to the compression of the at least first optical waveguide, that provides the displacement signal indicative of the change in the compression of the at least first optical waveguide.

10. The tunable Raman laser of claim 9, wherein the displacement sensor includes a capacitance sensor coupled to the at least first optical waveguide that measures the change in the capacitance that depends on the change in the compression of the at least first optical waveguide.

11. The tunable Raman laser of claim 1, wherein the respective first, second, third and fourth reflection wavelengths of the respective first, second, third and fourth reflective elements substantially align with successive Stokes order of the Raman laser, when the first and second optical waveguides are loaded at a predetermined strain.

12. The tunable Raman laser of claim 1, wherein the portions of each of the first and second optical waveguides, having different cross-sectional areas, provide a progressively greater cross-sectional area of the corresponding first and second optical waveguides for each progressively decreasing first, second, third and fourth reflection wavelength of each of the respective first, second, third and fourth reflective elements.

13. The tunable Raman laser of claim 1, wherein the portion of the first optical waveguide, having different cross-sectional areas, includes first and second stepped regions, the first and second stepped regions having respective first and second reflective elements disposed therein; and the portion of the second optical waveguide, having different cross-sectional areas, includes third and fourth stepped regions, the third and fourth stepped regions having respective third and fourth reflective elements disposed therein.

14. A tunable Raman optical amplifier for amplifying an input light signal having a wavelength, the amplifier comprising:

a pump source providing pump radiation having a predetermined wavelength;

an optical coupler for coupling the pump radiation into the input light signal;

a first optical waveguide including at least first and second reflective elements, the first and second reflective elements having respective first and second reflection wavelengths;

a second optical waveguide including at least third and fourth reflective elements, the third and fourth reflective elements having respective third and fourth reflection wavelengths, wherein the first and second reflection wavelengths of the respective first and second reflective elements are substantially the same as respective third and fourth reflection wavelengths of the third and fourth reflective elements to form at least a pair of resonant cavities;

an optical waveguide providing Raman gain optically coupled between the first optical waveguide and the second optical waveguide; and a tuning device, responsive to a signal representative of a desired output wavelength, that stresses the first and second optical waveguides to change the first, second, third and, fourth reflective wavelengths of the respective first, second, third and fourth reflective elements;

whereby portions of each of the first and second optical waveguides have different cross-sectional areas such that when the first and second optical waveguides are stressed, the first and second reflection wavelengths of the first and second reflective elements change proportionally and the third and fourth reflection wavelengths of the third and fourth reflective elements change proportionally.

15. The tunable Raman optical amplifier of claim 14, wherein at least one of the first and second optical waveguides has an outer transverse dimension of at least 0.3 mm.

16. The tunable Raman optical amplifier of claim 14, wherein at least one of the first and second optical waveguides comprises a cane element.

17. The tunable Raman optical amplifier of claim 14, wherein at least one of the first and second optical waveguides comprises:

a tube, having an optical fiber and the reflective elements encased therein along a longitudinal axis of the tube, the tube being fused to at least a portion of the optical fiber.

18. The tunable Raman optical amplifier of claim 14, wherein each of the reflective elements comprises a Bragg grating written in the inner core of each of the respective first and second optical waveguides.

19. The tunable Raman optical amplifier of claim 14, wherein the tuning device comprises:

a first strain device that compresses axially the first optical waveguide to tune the first and second reflective elements to desired first and second reflection wavelengths; and a second strain device that compresses axially the second optical waveguide to tune the third and fourth reflective elements to desired third and fourth reflection wavelengths.

20. The tunable Raman optical amplifier of claim 14, wherein the tuning device comprises:

a first strain device that tensions the first optical waveguide to tune the first and second reflective elements to desired first and second reflection wavelengths; and a second strain device that tensions the second optical waveguide to tune the third and fourth reflective elements to desired third and fourth reflection wavelengths.

21. The tunable Raman optical amplifier of claim 14, wherein the tuning device comprises:

a first thermal device that varies the temperature of at least the first optical waveguide to tune the respective first and second respective reflective elements.

22. The tunable Raman optical amplifier of claim 14, wherein the tuning device comprises:

a compression device that compresses axially at least the first optical waveguide to tune the first and second reflective elements to desired first and second reflection wavelengths, responsive to a displacement signal; and a displacement sensor, responsive to the compression of the at least first optical waveguide, that provides the displacement signal indicative of the change in the compression of the at least first optical waveguide.

23. The tunable Raman optical amplifier of claim 22, wherein the displacement sensor includes a capacitance sensor coupled to the at least first optical waveguide that measures the change in the capacitance that depends on the change in the compression of the at least first optical waveguide.

24. The tunable Raman optical amplifier of claim 14, wherein the respective first, second, third and fourth reflection wavelengths of the respective first, second, third and fourth reflective elements substantially align with successive Stokes order of the Raman amplifier, when the first and second optical waveguides are loaded at a predetermined strain.

25. The tunable Raman optical amplifier of claim 14, wherein the portions of each of the first and second optical waveguides, having different cross-sectional areas, provide a progressively greater cross-sectional area of the corresponding first and second optical waveguides for each progressively decreasing first, second, third and fourth reflection wavelength of each of the respective first, second, third and fourth reflective elements.

26. The tunable Raman optical amplifier of claim 14, wherein the portion of the first optical waveguide, having different cross-sectional areas, includes first and second stepped regions, the first and second stepped regions having respective first and second reflective elements disposed therein; and the portion of the second optical waveguide, having different cross-sectional areas, includes third and fourth stepped regions, the third and fourth stepped regions having respective third and fourth reflective elements disposed therein.

27. The tunable Raman laser of claim 1, wherein the resonant cavities are nested.

28. The tunable Raman laser of claim 1, wherein the resonant cavities are overlapping.

29. The tunable Raman optical amplifier of claim 14, wherein the resonant cavities are nested.

30. The tunable Raman optical amplifier of claim 14, wherein the resonant cavities are overlapping.

31. The tunable Raman laser of claim 1, wherein the first optical waveguide including first, second and fifth reflective elements, the first, second and fifth reflective elements having respective first, second and fifth reflection wavelengths; and the second optical waveguide including third, fourth and sixth reflective elements, the third, fourth and sixth reflective elements having respective third, fourth and sixth reflection wavelengths, wherein the first, second and fifth reflection wavelengths of the respective first, second and fifth reflective elements are substantially the same as respective third, fourth and sixth reflection wavelengths of the third, fourth and sixth reflective elements to form three resonant cavities;

whereby portions of each of the first and second optical waveguides have different cross-sectional areas such that when the first and second optical waveguides are stressed, the first, second and fifth reflection wavelengths of the first, second and fifth reflective elements change proportionally and the third, fourth and sixth reflection wavelengths of the third, fourth and sixth reflective elements change proportionally.

32. The tunable Raman optical amplifier of claim 14, wherein the first optical waveguide including first second and fifth reflective elements, the first, second and fifth reflective elements having respective first, second and fifth reflection wavelengths; and the second optical waveguide including third, fourth and sixth reflective elements, the third, fourth and sixth reflective elements having respective third, fourth and sixth reflection wavelengths, wherein the first, second and fifth reflection wavelengths of the respective first, second and fifth reflective elements are substantially the same as respective third, fourth and sixth reflection wavelengths of the third, fourth and sixth reflective elements to form three resonant cavities;

whereby portions of each of the first and second optical waveguides have different cross-sectional areas such that when the first and second optical waveguides are stressed, the first, second and fifth reflection wavelengths of the first, second and fifth reflective elements change proportionally and the third, fourth and sixth reflection wavelengths of the third, fourth and sixth reflective elements change proportionally.

* * * * *